(12) United States Patent
Volftsun et al.

(10) Patent No.: US 11,293,794 B1
(45) Date of Patent: Apr. 5, 2022

(54) THERMAL FLOW SENSOR FOR BEVERAGE METERING

(71) Applicants: Lev Volftsun, Sterling, VA (US); Alex Belfore, Sterling, VT (US)

(72) Inventors: Lev Volftsun, Sterling, VA (US); Alex Belfore, Sterling, VT (US)

( * ) Notice: Subject to any disclaimer, the term of this patent is extended or adjusted under 35 U.S.C. 154(b) by 359 days.

(21) Appl. No.: 16/708,788

(22) Filed: Dec. 10, 2019

Related U.S. Application Data

(63) Continuation-in-part of application No. 15/935,421, filed on Mar. 26, 2018, now abandoned, and a continuation-in-part of application No. PCT/US2018/013415, filed on Jan. 11, 2018, and a continuation-in-part of application No. 15/869,028, filed on Jan. 11, 2018, now Pat. No. 10,294,093, and a continuation-in-part of application No. 15/487,488, filed on Apr. 14, 2017, now Pat. No. 9,926,181, and a continuation-in-part of application No. 15/424,478, filed on Feb. 3, 2017, now Pat. No. 10,167,183, and a continuation-in-part of application No. 15/332,117, filed on Oct. 24, 2016, now Pat. No. 10,294,092, and a continuation-in-part of application No. 14/686,820, filed on Apr. 15, 2015, now Pat. No. 10,125,002.

(60) Provisional application No. 62/023,899, filed on Jul. 13, 2014.

(51) Int. Cl.
*G01F 1/684* (2006.01)
*B67D 1/08* (2006.01)
*G01F 1/699* (2006.01)

(52) U.S. Cl.
CPC ........ *G01F 1/6847* (2013.01); *B67D 1/0855* (2013.01); *G01F 1/699* (2013.01)

(58) Field of Classification Search
CPC ...... G01F 1/6847; G01F 1/699; B67D 1/0855
See application file for complete search history.

(56) References Cited

U.S. PATENT DOCUMENTS

| | | |
|---|---|---|
| 4,501,144 A | 2/1985 | Higashi et al. |
| 5,452,610 A | 9/1995 | Kleinhan et al. |
| 8,040,493 B2 * | 10/2011 | Fulkerson et al. .... G01F 1/7084 356/28 |
| 8,739,598 B2 | 6/2014 | Ubel et al. |
| 9,366,557 B2 | 6/2016 | Soreefan |

(Continued)

*Primary Examiner* — Kevin L Lee
(74) *Attorney, Agent, or Firm* — Gugliotta & Gugliotta LPA

(57) ABSTRACT

A thermal flow sensor is provide for beverage metering using a heater in physical and thermal communication the beverage dispensing conduit. A temperature sensing element is positioned distant from and downstream from said heater along said direction of fluid flow. A computing device controls the heater and the temperature sensing element and computes a cumulative total volume during a metering cycle. The computing of a cumulative total volume during a metering cycle may be adapted or approximated to account for residual changes in temperature of the conduit or thermal sensing element metering cycles. Flow measurement is thereby without direct physical contact with the beverage itself, thereby providing cleanable fluid paths within the beverage conduit that limits or eliminate voids or trapped volumes. The instant abstract is neither intended to define the invention disclosed in this specification nor intended to limit the scope of the invention in any way.

22 Claims, 3 Drawing Sheets

(56) References Cited

U.S. PATENT DOCUMENTS

2004/0076215 A1     4/2004   Baumbach
2004/0261520 A1   12/2004   Lotters
2019/0136492 A1*   5/2019   Trescott et al. ....... G01F 1/6847

* cited by examiner

THERMAL FLOW SENSOR FOR BEVERAGE METERING

RELATED APPLICATIONS

The present invention is a Continuation in Part of U.S. patent application Ser. No. 15/332,117, filed on Oct. 24, 2016 as a Continuation in Part of U.S. Pat. No. 10,125,002, filed on Apr. 15, 2015, and claiming priority of U.S. Provisional Application 62/023,899 filed on Jul. 13, 2014. The present invention is also a Continuation in Part of U.S. patent application Ser. No. 15/869,028 filed on Jan. 11, 2018, also as a Continuation in Part of U.S. Pat. No. 10,125,002 filed on Apr. 15, 2015. The present invention is also a Continuation in Part of U.S. patent application Ser. No. 15/332,117 filed on Oct. 24, 2016 which is also a Continuation in Part of U.S. Pat. No. 10,125,002. All Related References are incorporated by reference as if fully rewritten herein.

BACKGROUND OF THE INVENTION

1. Field of the Invention

The present invention relates to a system and method for the automated, controlled, metered and reported dispensing bulk, pressurized beverages and, more particularly, to improved flow metering for use therein.

2. Description of the Related Art

As indicated in the Related Art, dispensing and pour control systems have developed for dispensing regulated beverages from a bulk storage and distribution system. Whether for use with bulk wine, mixed drinks, or carbonated beverages such as sparkling wine or beer, such systems have gain rapid and unexpected commercial success as provided by Sestra Systems, LLC of Sterling, Va. Met with nearly universal commercial acclaim, the TapWise® and Push to Pour® Smart Dispensing Solutions from Sestra Systems solve long felt and unresolved needs related to over-pouring, theft, spoilage, breakages and real time management reporting. Especially successful in high volume dispensing and service applications, current Internet-of-Things (IoT) enabled keg dispensed beverage systems provide push button dispensing, portion control, data analytics and remote management.

As provided in the Related Art, such systems utilize a metering chamber wherein a volume control bidirectional operated piston is used to meter and discharge Individual known volumes of liquid in a series of uninterrupted and individually metered volumes delivered as a continuous and uninterrupted fluid flow into a drinking container. By monitoring, controlling and anticipating the movement of the metering piston, portion control can be adjusted continuously and in real time.

As such, sensors for determining piston location become important, in type, quantity and arrangement. The sensor mechanism used to detect the position of the piston identifies a target within the piston to communicate position. Used to detect proximity of the target, multiple sensors may be positioned along the length of the metering chamber in order to increase precision of positioning the piston. Such sensors may consisting of RF sensors, magnets or halo effect sensors, magnetostrictive, or IR sensors. Such sensors may further be embedded within the chamber such that a sensor target formed in said piston can be quickly, easily, and repeatable detected.

Cost, repeatability and reliability of such sensors remains a gating element in the deployment and operation of such systems. Decreasing service interruptions that require onsight, time consuming interventions of trained technicians would thereby aid greatly in the deployment of TapWise® and Push to Pour® equipment. Limiting such issues around sensor functionality, especially in the middle of a large venue event such as a football or baseball game, would provide a great benefit.

Consequently, new and better systems or methods for measuring mass or flow are constantly desired. However, the present intended use of such mass or flow measurement has other operational limitations. The relentless need to use cleanable fluid paths that limit or eliminate voids or trapped volumes would make non-contact metering systems more advantageous.

Some methods and devices are known that incorporate various mechanisms for providing non-contact measurement of mass or volume flow. For example:

U.S. Pat. No. 4,501,144, issued in the name of Higashi et al., discloses a flow sensor comprising a pair of thin film heat sensors and a thin film heater. Used for measuring the mass flow of air, the temperature drop and associated change in electrical resistance cause by the cooling effect of the air stream is used as a measure of the air flow velocity. With temperature change being non-linearly correlated with air flow, a compensation of the electrical signal is further provided.

U.S. Pat. No. 5,452,610m, issued in the name of Kleinhans et al., discloses a mass flow sensor having two membranes: a measuring element; and, a media-temperature heating element. With fluid flowing past these two membranes, the heat flux from the heating element transferred to the fluid medium can be measured by the measuring element. With the output signal of this mass flow sensor being quick to adapt to changes in the medium temperature, sudden changes in the temperature of the medium are suppressed. Such a configuration is suited for fast-acting response scenarios, such as measuring air mass inducted by an engine in a motor vehicle.

U.S. Pat. No. 9,366,557, issued in the name of Soreefan, discloses a thermal flow sensor having each a heater and a sensor each mounted on membrane chip substrate. Used to measure a gas flow through a conduit, as the gas flows heat is convectively transferred from the heater to the sensor such that the temperature gain measured may be correlated to the flowrate of gas.

U.S. Patent Publication No. 2004/0076215, published in the name of Baumbach, describes a temperature measuring device that adds a heat conducting shield and a Peltier effect heat pump to effectively amplifies both the flow of heat and the measurement of temperature change in such thermal differential flow sensors. Such an arrangement is used to measure surface temperature of a surface or conduit wall through or over which a fluid is flowing in order to indirectly measure the flow of such a fluid.

U.S. Patent Publication No. 2004/0261520, published in the nam e of Lotters, discloses a thermal type mass flow sensor comprising a planar, thin substrate with a sensing surface that can be brought into direct or indirect contact with a flowing fluid during a measurement. An electrically controllable heating means and temperature sensor means are used for determining a temperature difference on the sensing surface by a planar technique. The substrate with its sensing surface is present in particular in a cavity of a module into which a feed line and a drain line for the fluid issue.

Additionally, widely known are Pitot tube, hot-wire and hot-film anemometers as common measurement methods that extract point-wise velocity by direct contact between the anemometer probe and the flow stream. These methods affect the near-probe flow and are considered as intrusive measurement techniques. The Pitot tube extracts velocity after measuring total (stagnation) and static pressures. Hot-wire and hot-film anemometers work on the basis of electrical resistance of their sensor (probe) that depends on heat transfer and therefore on the local flow velocity. The sensor is made of a thin metal wire (materials such as tungsten and platinum) or film so that its resistance is very sensitive to temperature variation. The probe is heated to a temperature that is considerably higher than the fluid temperature. The final temperature and resistance of the probe depends on the rate of heat loss from the probe into the fluid that strictly depends on the fluid velocity. Accordingly, measurement of voltage drop across the probe wire/film leads to extraction of local velocity magnitude.

In comparison with the Pitot tube, hot-wire and hot-film methods are more accurate and have considerably shorter response time (significantly higher measurement frequency). While such principals may be adapted for use in measuring the flow of liquids, they remain invasive into the fluid stream and, as such, would pose unacceptable in the metering of bulk dispensed pressurized beverages due to necessary secondary operational considerations such as allowing cleanable fluid paths that limit or elimination of voids or trapped volumes.

For use in the metering of bulk dispensed pressurized beverages, planar thermal flow type sensors may have some advantages as well as some challenges. Such sensor can be solid state, which can make them inexpensive and reliable. They can be adapted to limit or eliminate voids or trapped volumes or made non-contacting with the fluid being metered. However, such devices are not effective where temperatures fluctuate greatly. Further, they have generally been deployed in contact with a gas stream and pose challenges due to heat transfer when measuring relatively high thermally conductive liquids. Finally, no such non-contact, planar thermal sensor has yet been developed for measuring the fluid flow of a beverage, nevertheless within a beverage metering and portion control dispensing system.

Consequently, a need has been felt for providing a non-contact, thermal type flow sensor for use in conjunction with an automated beverage metering system.

SUMMARY OF THE INVENTION

It is thus an object of the present invention to provide a liquid metering sensor for measuring beverage dispensing in the start-stop mode operation of an automated beverage metering system.

It is a feature of the present invention to provide a non-contact, thermal type liquid flow sensor.

The present invention provides a thermal flow sensor for use in beverage metering for fluid flow ranges between 0 ml/min up to 3000 ml/min and in the temperature range between −50° C. to +180° C. A beverage dispensing conduit is provided in fluid communication from a bulk volume to a spigot along a direction of fluid flow. A heater is in physical and thermal communication with a sidewall of said beverage dispensing conduit. A temperature sensing element is positioned distant from and downstream from said heater along said direction of fluid flow. A thermal isolation mechanism may also be introduced for hindering a thermal flux between said heater and said temperature sensing element. A computing device is in commutation with and controls the heater and the temperature sensing element and computes a cumulative total volume during a metering cycle that starts upon opening of a control valve and for initiating a control signal to the control valve when the cumulative total volume during said metering cycle equals a selected volume. The computing of a cumulative total volume during a metering cycle may be adapted or approximated to account for residual changes in temperature of the conduit or thermal sensing element metering cycles.

An advantage of the present invention is that it can be made inexpensive both to make and use.

It is another advantage of the present invention to provide a reliable flow sensor that is inherently free of significant failure modes.

It is a further advantage of the present invention to provide a flow sensor that operates without contacting the liquid beverage, thereby facilitating sanitary operation.

It is yet another advantage of the present invention to measure liquid flow with accuracy within a narrow beverage temperature range.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
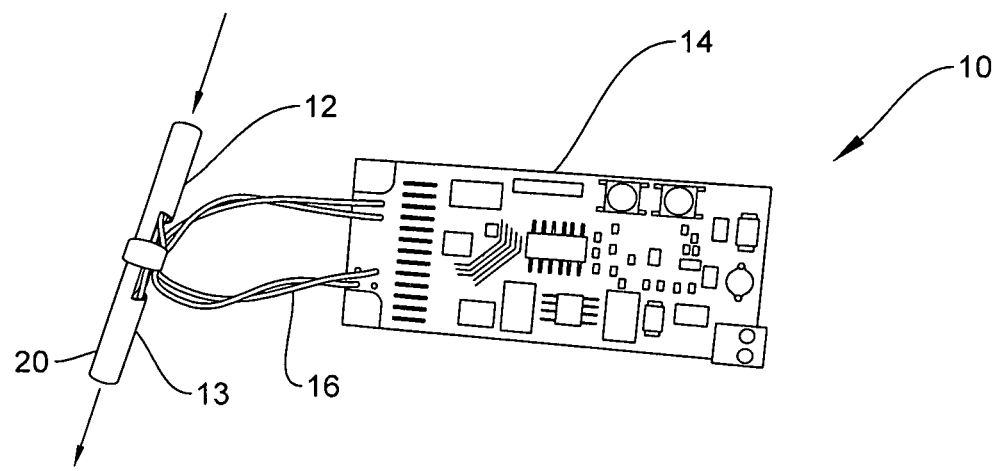
FIG. 1 is a photograph depicting a prototype for a thermal flow sensor for beverage metering according to a preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a thermal flow sensor for beverage metering, generally referenced as 10, is shown according to a preferred embodiment of the present invention. As shown best in conjunction with FIG. 1 and FIG. 2, the sensor 10 consists essentially of a thermal sensor element 12, a heater 13, a computing device 14, and a communication bus 16 between the computing device 14 and the thermal sensor element 12 and heater 13.

The thermal sensor element 12 may be a thermocouple or other solid state sensor that can provide an electrical signal that can be correlated to temperature. The thermal sensor element 12 may be in physical contact with a sidewall of a beverage distribution conduit 20 such as to provide an indirect measurement of the fluid beverage contained therein. Calibration of the electrical signal may be provided in a manner that the correlation of electrical signal to measured temperature may be ascertained.

The heater 13 may be of any type adapted to provide a known and controllable temperature increase of and in physical contact with a sidewall of a beverage distribution conduit 20. One such heater 13 main include an elongated linear thin film resistor element in parallel with the flow direction of the beverage distribution conduit 20.

Figure 2:
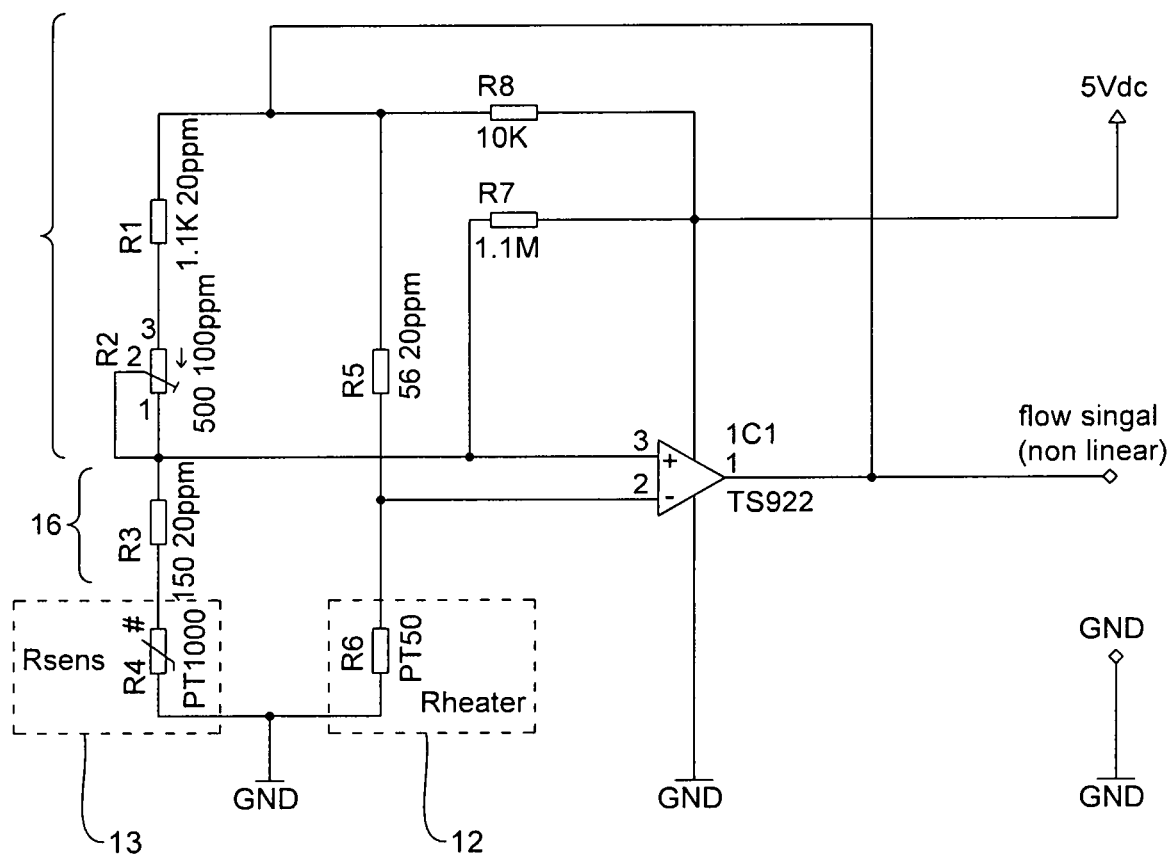
FIG. 2 is an electrical schematic thereof.

As shown in conjunction with FIG. 2, an exemplary electrical schematic is provided indicating a general wiring or circuit configuration between the thermal sensor element 13, heater 12 and computing device 14. The computing device 14 is adapted to receive a signal from the thermal flow sensor and to calculate a flow characteristic from the signal. The computing device 14 acquires a voltage output from the heater 12 that correlates temperature changes sensed by the thermal sensor element 13, as well as signals that correspond with the operation of the heater 12 and thermal sensor element 13. Measurements and calculations that allow for the integration of total heat flux applied to the system through the heater 12 is thereby compared with measurements and calculations that allow for the integration of total heat flux received by the thermal sensor element 13. As shown in conjunction with greater details provided herein and below, correlations to fluid mass flowrate may thereby be determined by the computing device and transmitted as a control signal.

As would be understood a person having ordinary skill in the relevant art in light of the present teachings, the computing device 14 may further provide for calibration of any signal from the thermal flow sensor so as to allow calculation of temperature based upon the sensor signal value.

The communication bus 16 may be provided to allow for informational communication between each of the heater 12 and thermal sensor element 13 with computing device 16. The communication bus may further be of any functional equivalent, including, inter alia, a wireless communication mechanism that would allow the heater 12 and thermal sensor element 13 to be in communication with the computing device 16.

2. Operation of the Preferred Embodiment

Figure 3:
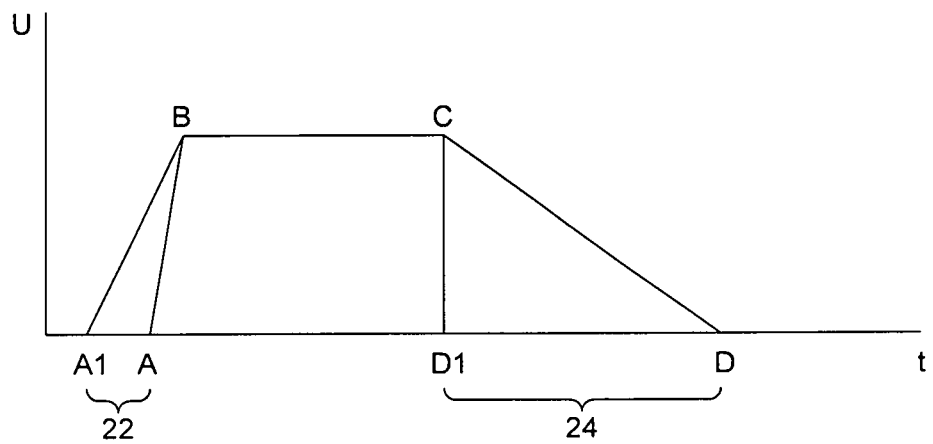
FIG. 3 is a graph showing typical sensor output for one single pour according to the preferred embodiment of the present invention.
Figure 4:
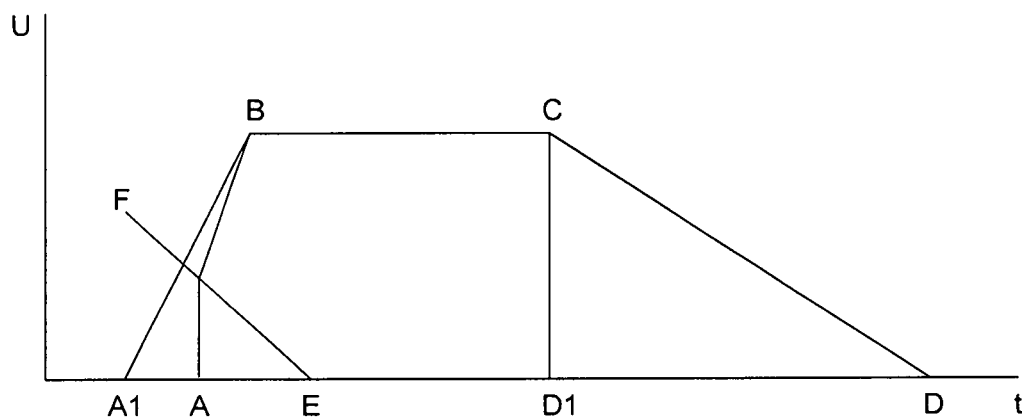
FIG. 4 a graph showing typical sensor output when several pours have occurred in rapid sequence.
Figure 5:
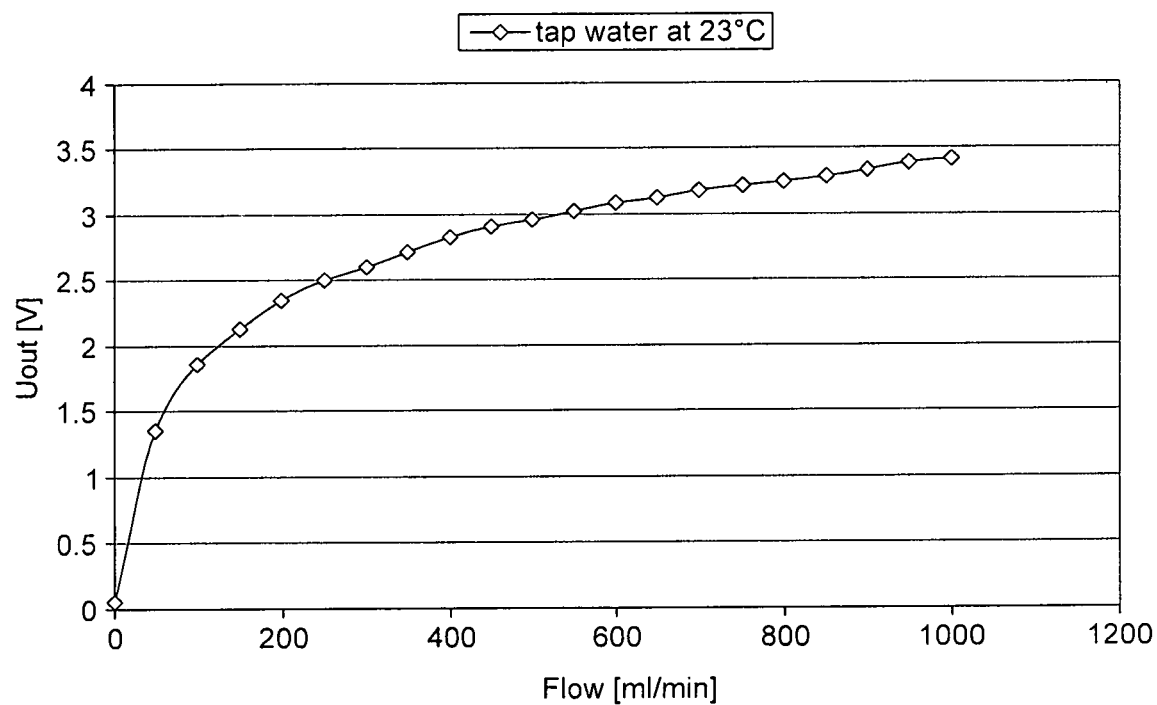
FIG. 5 is a table showing a fluid flow calibration showing flow vs. voltage of the thermal flow sensor of FIG. 1 and FIG. 2.

Referring now to FIG. 3 through FIG. 5, operation of the improved flow metering is best described for noncontact liquid flow measurement of relatively high thermally conductive liquids, and specifically such high thermally conductive liquids such as beer or wine that are further maintained at fluid temperature that is generally depressed from room temperature ambient. The liquid flow sensor 10 provides good accuracy when measuring the constant liquid flow from 0 ml/min to 3000 ml/min in the temperature range −50° C. to +180° C.

FIG. 3 shows a typical graph of thermo-anemometer sensor readings corresponding to a single pour. The readings from a calibrated sensor are always zero in case when the liquid is at rest. The total volume dispensed during one pour can be calculated as the area under the graph ABCF. Point A represents the start of a pour. Section AB represents the valve opening phase when the flow rate increases from zero to the maximum value (point B). During the active pour phase the valve remains open and the flow rate is constant and at its maximum value (section BC). Section CF represents valve closing when the rate of flow decreases. At point F the valve is completely closed. The liquid is at rest (flow rate is zero) after point F, however the sensor needs some time to cool down and sensor readings continue to be greater than zero. Point D on the chart represents sensor readings when the valve is completely closed. The dotted line DE shows the gradual exponential decrease in sensor readings corresponding to the cooling off process. The proposed algorithm takes into account the exact moment of valve closing and valve closing time to calculate the total volume dispensed during the pour as the area of polygon ABCF rather than based on the actual sensor readings represented by the graph ABCDE.

FIG. 4 represents the case when a new pour is initiated before the sensor is completely cooled off. Point A corresponds to the start of a new pour. The red line represents sensor readings from the previous pour. The flow rate at moment A is zero, however according to sensor readings, the flow rate is greater than zero (point B). The proposed algorithm disregards sensor readings while in section (BC) and instead uses the linear approximation of the graph as line AC, where point C represents the moment when the flow rate reached maximum.

Finally, as shown in FIG. 5 a fluid flow calibration is shown with flow vs. voltage of the thermal flow sensor of FIG. 1 and FIG. 2. As shown, a control signal output $U_{out}$ is shown versus flowrate and may be used to provide liquid flow measurement through the beverage conduit 20 without being in direct physical contact with the beverage itself. Such mass or flow measurement may thereby be provided with cleanable fluid paths within the beverage conduit 20 that limits or eliminate voids or trapped volumes.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A thermal flow sensor for the beverage metering comprising:
    a beverage dispensing conduit being in fluid communication from a bulk volume to a spigot along a direction of fluid flow;
    a heater in physical and thermal communication with a sidewall of said beverage dispensing conduit;
    a temperature sensing element positioned distant from and downstream from said heater along said direction of fluid flow;
    a computing device in commutation with control of said heater and said temperature sensing element, said computing device for computing a cumulative total volume during a metering cycle that starts upon opening of a control valve and for initiating a control signal to the control valve when the cumulative total volume during said metering cycle equals a selected volume.

2. The thermal flow sensor for the beverage metering of claim 1, wherein computing a cumulative total volume during a metering cycle is adapted or approximated to account for residual changes in temperature of the conduit or thermal sensing element metering cycles.

3. The thermal flow sensor for the beverage metering of claim 1, wherein said dispensing conduit is formed of a food grade stainless steel sidewall.

4. The thermal flow sensor for the beverage metering of claim 1, wherein said dispensing conduit is formed of a food grade engineered plastic sidewall.

5. The thermal flow sensor for the beverage metering of claim 1, wherein said heater is in direct physical communication with said sidewall.

6. The thermal flow sensor for the beverage metering of claim 1, further comprising:
    a thermal isolation mechanism for hindering a thermal flux between said heater and said temperature sensing element.

7. The thermal flow sensor for the beverage metering of claim 1, wherein:
    said heater is formed of a first solid state structure mounted to a first membrane on a solid state substrate; and
    said temperature sensing element is formed of a second solid state structure mounted to a second membrane on the solid state substrate, the second membrane physically isolated from the first membrane via the solid state substrate and being substantially conductively isolated from the first membrane by material of the solid state substrate, the solid state substrates having a different material from the first and second membranes.

8. The thermal flow sensor for the beverage metering of claim 1, wherein said fluid flow ranges between 0 ml/min up to 3000 ml/min in the temperature range between −50° C. to +180° C.

9. A method of metering beverage volume using the thermal flow sensor for the beverage metering of claim 1, said method comprising:
    initiating the flowing of a beverage through the beverage conduit;
    heating said flowing beverage through said beverage conduit at a first location at an identifiable thermal flux;
    measuring a temperature of said flowing beverage at a second location, said second location being in a downstream direction of flow relative to said first location;
    calculating an average speed of fluid flow based upon the measured temperature at the second location;
    measuring a time duration from the initiating of flow and determining volumetric flow rate and calculating total cumulative flow of beverage of a cycle beginning at the initiating of flowing of a beverage; and
    stopping the flowing of beverage when said total cumulative flow equals a target volume.

10. A method of metering beverage volume using the thermal flow sensor for the beverage metering of claim 2, said method comprising:
    initiating the flowing of a beverage through the beverage conduit;
    heating said flowing beverage through said beverage conduit at a first location at an identifiable thermal flux;
    measuring a temperature of said flowing beverage at a second location, said second location being in a downstream direction of flow relative to said first location;
    calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

11. A method of metering beverage volume using the thermal flow sensor for the beverage metering of claim 3, said method comprising:

initiating the flowing of a beverage through the beverage conduit;

heating said flowing beverage through said food grade conduit at a first location at an identifiable thermal flux;

measuring a temperature of said flowing beverage at a second location, said second location being in a downstream direction of flow relative to said first location;

calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

12. A method of metering beverage volume using the thermal flow sensor for the beverage metering of claim 4, said method comprising:

initiating the flowing of a beverage through the beverage conduit;

heating said flowing beverage through the beverage conduit at a first location at an identifiable thermal flux;

measuring a temperature of said flowing beverage at a second location, said second location being in a downstream direction of flow relative to said first location;

calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

13. A method of metering beverage volume using the thermal flow sensor for the beverage metering of claim 5, said method comprising:

initiating the flowing of a beverage through the beverage conduit;

heating said flowing beverage through the beverage conduit at a first location at an identifiable thermal flux;

measuring a temperature of said flowing beverage at a second location, said second location being in a downstream direction of flow relative to said first location;

calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

14. A method of metering beverage volume using the thermal flow sensor for the beverage metering of claim 6, said method comprising:

initiating the flowing of a beverage through the beverage conduit;

heating said flowing beverage through the beverage conduit at a first location at an identifiable thermal flux;

measuring a temperature of said flowing beverage at a second location, said second location being in a downstream direction of flow relative to said first location;

calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

15. A method of metering beverage volume using the thermal flow sensor for the beverage metering of claim 7, said method comprising:

initiating the flowing of a beverage through the beverage conduit;

heating said flowing beverage through the beverage conduit at a first location at an identifiable thermal flux;

measuring a temperature of said flowing beverage at a second location, said second location being in a downstream direction of flow relative to said first location;

calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

16. A method of metering beverage volume using the thermal flow sensor for the beverage metering of claim 8, said method comprising:

initiating the flowing of a beverage through the beverage conduit;

heating said flowing beverage through the beverage conduit at a first location at an identifiable thermal flux;

measuring a temperature of said flowing beverage at a second location, said second location being in a downstream direction of flow relative to said first location;

calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

17. A method of metering a beverage volume comprising:

initiating the flowing of a beverage through a food grade conduit;

heating said flowing beverage through said food grade conduit at a first location at an identifiable thermal flux;

measuring a temperature of said flowing beverage at a second location, said second location being in a downstream direction of flow relative to said first location;

calculating an average speed of fluid flow based upon the measured temperature at the second location;

measuring a time duration from the initiating of flow and determining volumetric flow rate and calculating total cumulative flow of beverage of a cycle beginning at the initiating of flowing of a beverage; and stopping the flowing of beverage when said total cumulative flow equals a target volume.

18. The method of metering a beverage volume of claim 17, wherein said food grade conduit is formed of a sidewall comprised of stainless.

19. The method of metering a beverage volume of claim 17, wherein said food grade conduit is formed of a sidewall comprised engineered plastic.

20. The method of metering a beverage volume of claim 17, wherein said heater is in direct physical communication with said sidewall.

21. The method of metering a beverage volume of claim 17, further comprising:
   isolating or hindering a thermal flux between said heating said flowing beverage and said measuring a temperature of said flowing beverage.

22. The method of metering a beverage volume of claim 17, wherein the measuring a time duration from the initiating of flow and determining volumetric flow rate and calculating total cumulative flow of beverage of a cycle beginning at the initiating of flowing of a beverage is calibrated for or adapted to accommodate a lag in a response time for the temperature changes.

* * * * *